(12) United States Patent
Ruan et al.

(10) Patent No.: US 11,030,317 B2
(45) Date of Patent: Jun. 8, 2021

(54) INDEPENDENTLY RECOVERABLE SECURITY FOR PROCESSOR AND PERIPHERAL COMMUNICATION

(71) Applicant: Intel Corporation, Santa Clara, CA (US)

(72) Inventors: Xiaoyu Ruan, Folsom, CA (US); William A. Stevens, Jr., Folsom, CA (US); David Novick, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 196 days.

(21) Appl. No.: 16/368,647

(22) Filed: Mar. 28, 2019

(65) Prior Publication Data

US 2019/0220602 A1    Jul. 18, 2019

Related U.S. Application Data

(60) Provisional application No. 62/778,231, filed on Dec. 11, 2018.

(51) Int. Cl.
| | | |
|---|---|---|
| *G06F 21/73* | (2013.01) | |
| *G06F 21/64* | (2013.01) | |
| *G06F 21/57* | (2013.01) | |
| *G06F 8/654* | (2018.01) | |
| *G06F 9/44* | (2018.01) | |
| *G06F 8/60* | (2018.01) | |

(52) U.S. Cl.
CPC .......... *G06F 21/572* (2013.01); *G06F 8/654* (2018.02); *G06F 21/575* (2013.01); *G06F 21/64* (2013.01); *G06F 21/73* (2013.01)

(58) Field of Classification Search
CPC ........ G06F 21/57; G06F 221/73; G06F 21/64; G06F 8/654; G06F 21/575; G06F 9/4411
USPC ................................................. 713/1, 2, 100
See application file for complete search history.

(56) References Cited

U.S. PATENT DOCUMENTS

2018/0176211 A1* 6/2018 Bernabeu ............ H04L 63/0853
2018/0365406 A1* 12/2018 Elnekaveh ............ H04L 9/0819

* cited by examiner

*Primary Examiner* — Michael J Brown
(74) *Attorney, Agent, or Firm* — Jaffery Watson Mendonsa & Hamilton LLP

(57) ABSTRACT

Embodiments described herein enable independently recoverable security for processor and peripheral communication, enabling a processor without native non-volatile memory to generate and recover credentials in response to a firmware update. The processor and peripheral can each have credentials burned into secure fuses. The processor can derive a shared secret from the secure fuses using security attributes that are based on the security version number of firmware within the processor and the peripherals to which the processor is to security communicate. The processor and peripherals can generate ephemeral session keys from the shared secret and nonces. The ephemeral session keys can be used to secure communications between the processor and the peripherals.

17 Claims, 12 Drawing Sheets

INDEPENDENTLY RECOVERABLE SECURITY FOR PROCESSOR AND PERIPHERAL COMMUNICATION

CROSS-REFERENCE

This application claims priority to U.S. Provisional Patent Application No. 62/778,231 filed Dec. 11, 2018, which is hereby incorporated herein by reference.

BACKGROUND

In existing computing platforms, communication between a host system processor, such as an application processor (AP) or central processing unit (CPU), and a connected peripheral is either unprotected or encrypted by global shared secrets that are hardcoded into the processor and the peripheral. In some systems, communications are unprotected due to the assumed difficulty of intercepting communications performed over an on-board high-speed interconnect. Where some protection or encryption is in place, global shared secrets are used due to the constraints of general-purpose CPU design. However, the use of hard-coded global shared secrets may leave a system vulnerable to exploits, such as break-once-run-everywhere attacks that leave an entire system vulnerable when a shared secret is compromised, the potential inability to recover from a compromised share secret, or if recovery is possible, difficulty synchronizing the new shared secret with all endpoints.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings, and in which.

DETAILED DESCRIPTION

Figure 1:
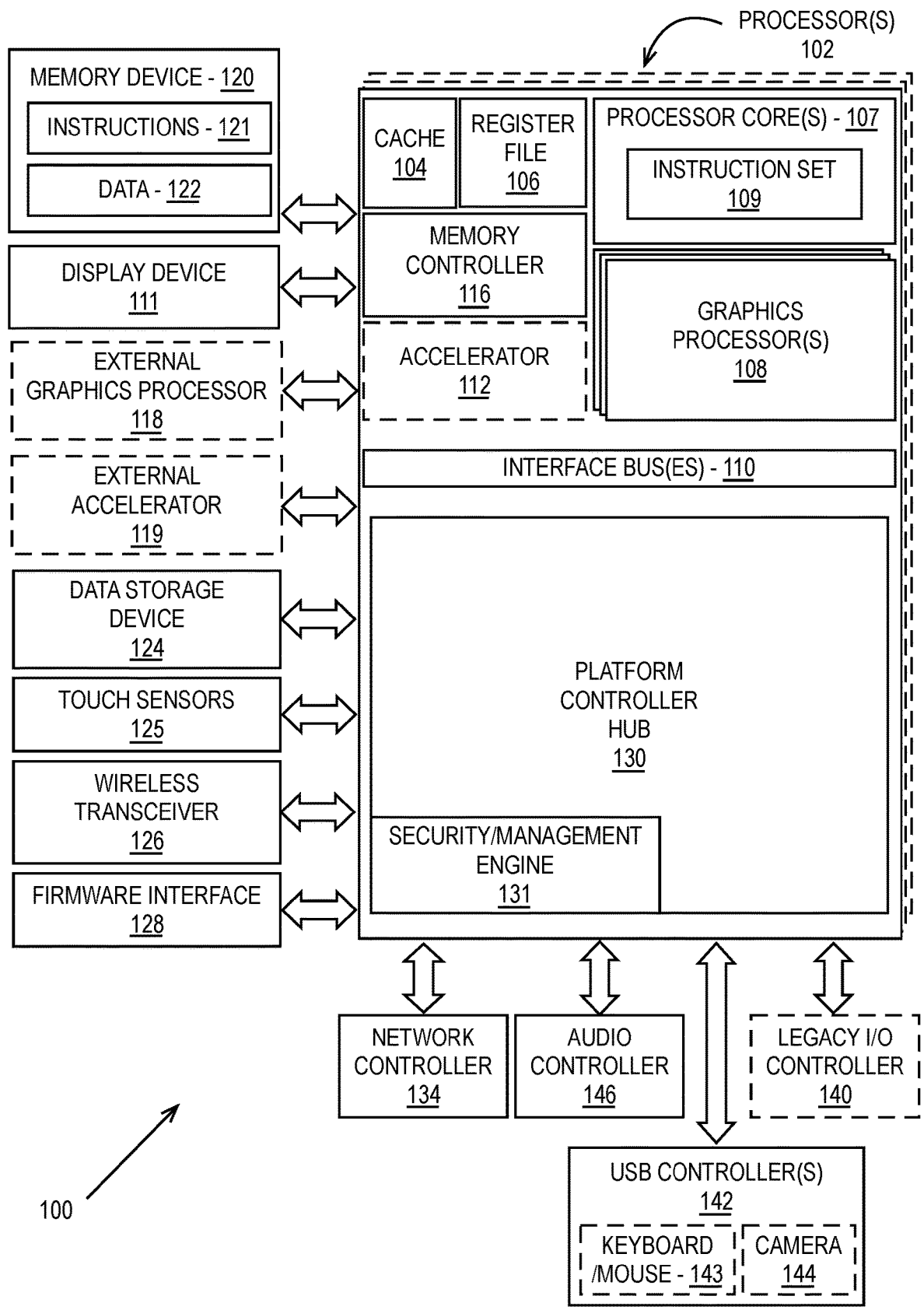
FIG. 1 is a block diagram of a processing system, according to an embodiment.

In embodiments described herein independently recoverable security is enabled for processor and peripheral communication. The processor and peripheral can each have credentials burned into secure fuses. After mutual authentication between the processor and the peripheral, the processor can derive a shared secret from the secure fuses within the processor and security attributes of itself and the Peripheral, such as the security version number of firmware within the processor and each peripheral. The processor can then send the shared secret to peripheral, which the peripheral stores in non-volatile memory that is dedicated to the peripheral. In subsequent power cycles, the peripherals can prompt the processor to re-derive the shared secrets from the secure fuses. Then, the processor and peripherals can generate ephemeral session keys from the shared secret and nonces. The ephemeral session keys can be used to secure communications between the processor and the peripherals. While the concepts described herein are generally directed towards central processing units (CPUs), the techniques can also apply to different types of processors.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, an overview of exemplary data processing system and processor logic is provided, along with details for the various embodiments presented herein. The following embodiments are described with reference to a CPU. However, similar techniques and teachings can be applied to other types of circuits or semiconductor devices, including but not limited to a many integrated core (MIC) processor, a graphics processor, or one or more instances of a field programmable gate array (FPGA).

System Overview

FIG. 1 is a block diagram of a processing system 100, according to an embodiment. System 100 may be used in a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, system 100 can include, couple with, or be integrated within: a server-based gaming platform; a game console, including a game and media console; a mobile gaming console, a handheld game console, or an online game console. In some embodiments the system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In one embodiment, system 100 can include, couple with, or be integrated within a self-driving vehicle such as a bus, tractor trailer, car, motor or electric power cycle, plane or glider (or any combination thereof). The self-driving vehicle may use system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses.

In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus. The PCH 130 can include a security/management engine 131, which can enable out-of-band management functionality for the system 100. The security/management engine 131, in one embodiment, is a converged security and management engine (CSME), which can be configured to enable a trusted execution environment that provides secure communications and secure operations for the system 100.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 118, which may communicate with the one or more graphics processors 108 in processors 102 to perform graphics and media operations. In some embodiments, graphics, media, and or compute operations may be assisted by an accelerator 112 which is a coprocessor that can be configured to perform a specialized set of graphics, media, or compute operations. For example, in one embodiment the accelerator 112 is a matrix multiplication accelerator used to optimize machine learning or compute operations. In one embodiment the accelerator 112 is a ray-tracing accelerator that can be used to perform ray-tracing operations in concert with the graphics processor 108. In one embodiment, an external accelerator 119 may be used in place of or in concert with the accelerator 112.

In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA) or via a peripheral bus, such as a Peripheral Component Interconnect bus (e.g., PCI, PCI Express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3 G, 4 G, 5 G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 118. In one embodiment the platform controller hub 130 and/or memory controller 116 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

Security Protocol Overview

While the system 100 includes a memory device 120 capable of non-volatile storage, as well as I/O controllers (e.g., USB controllers 142, legacy I/O 140) and a networking controller 134, the processor 102 lacks such native capability. The lack of native non-volatile storage, networking, or I/O prevents the use of popular security protocols such as TLS (transport layer security). Thus, an effective security protocol for processor to peripheral communications would be of benefit to the computing arts. Such security protocol should, at the least 1) provide mutual authentication, 2) confidentiality, integrity, and anti-reply for messages, 3) be compliant with cryptographic best practice (e.g., no reliance on global secrets), and 4) support isolated sessions between one processor and multiple peripherals. In addition, due to the constrains of processors within embedded environments, the new protocol should also feature 5) Independent recovery of credentials upon processor and peripheral firmware upgrade, such that a firmware update can recover credentials itself without a connection to network or external devices and 6) anti-rollback protection, such that session keys for higher security version numbered firmware cannot be disclosed to lower security version numbered firmware. A security protocol having the above functionality is provided herein. Such security protocol may be referred to herein as the SPIRAL (Security Protocol with Independent Recovery Algorithm) protocol.

Figure 2A:
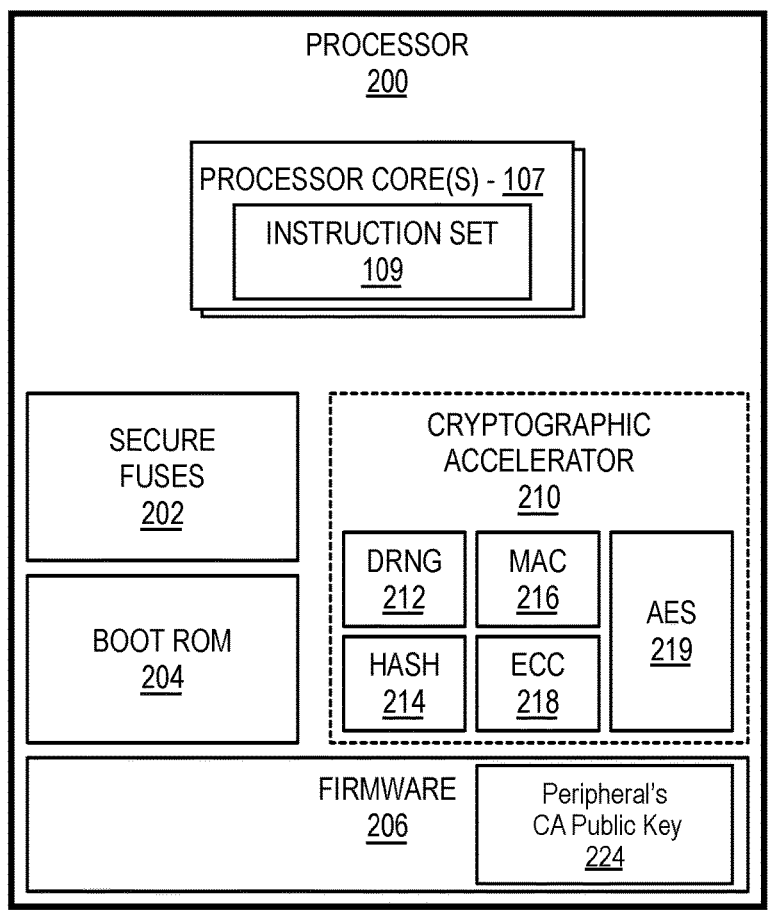
FIG. 2A-2C illustrate a processor equipped to make use of the security protocol described herein.
Figure 2B:
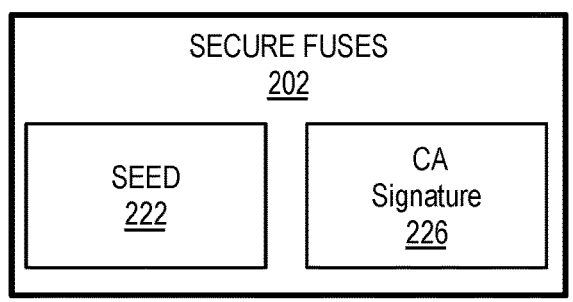
Figure 2C:
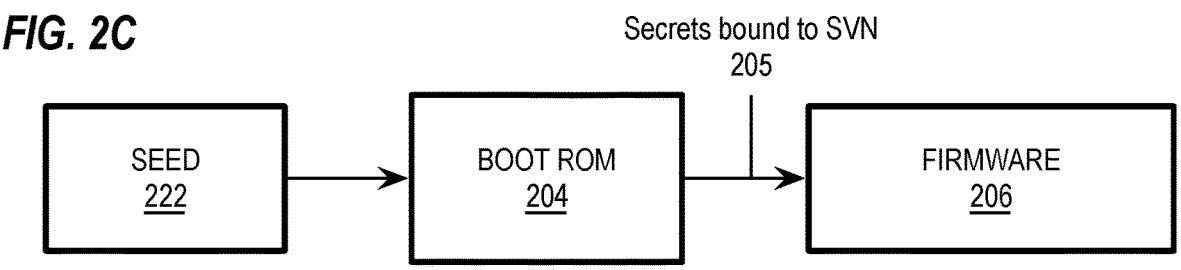

FIG. 2A-2C illustrate a processor equipped to make use of the security protocol described herein. The SPIRAL protocol provides, among other functionality, an independent recovery algorithm for processors without significant native non-volatile memory storage. FIG. 2A illustrates a processor 200 including processor cores 107 having an instruction set 109, as well as other functionality (not shown) similar to that of a processor 102 shown in FIG. 1. FIG. 2B illustrates contents of secure fuses 202 within the processor 200. FIG. 2C illustrates secure recovery of secrets for processor firmware.

As shown in FIG. 2A, the processor 200 additionally includes a set of secure fuses 202, a boot ROM 204, and firmware 206. The processor 200 can optionally include a cryptographic accelerator 210 that includes hardware logic to accelerate cryptographic operations used to enable independent recovery of security keys for the processor 200 after a firmware update. The cryptographic accelerator 210 can include a deterministic random number generator (DRNG 212), and logic to accelerate hash 214, message authentication code (MAC 216), elliptic curve cryptography (ECC 218), and advanced encryption standard (AES 219) operations. Alternatively, functionality provided by the cryptographic accelerator 210 can be performed by the boot ROM 204 and/or firmware 206 using instructions within the instruction set 109 of the processor cores 107.

The boot ROM 204 is the immutable root-of-trust for the system and has exclusive access to portions of the secure fuses 202. The boot ROM 204 can be, for example, a microcode ROM for a CPU and/or a bootloader ROM for system firmware, such as a security and/or manageability engine or management engine BIOS extension. The firmware 206 is loaded by the boot ROM 204. The firmware may be vulnerable, and it is versioned with a security version number (SVN). The processor vendor can release a firmware update having a higher SVN to fix security bugs in firmware having a lower SVN. The boot ROM 204 can read protected secrets that are bound to an SVN and pass those secrets to the firmware 206 for use. While the SVN can be incremented when security credentials of the processor should be updated or re-generated, a firmware update can occur without incrementing the SVN.

When the firmware 206 is updated, the SVN of the firmware is updated and the processor generates new key material based on the updated SVN. The new key material can be used to establish secure connections with any securely connected peripherals, which can also generate new material based on an update of the firmware SVN. The CA signature 226 is the signature of on the certificate that stores the touchstone values for use with each peripheral. In one embodiment, the processor firmware 206 can include the peripherals' CA public key 224. All peripherals' firmware can include a hardcoded CA public key 424 to verify the CA signature 226.

As shown in FIG. 2B secure fuses 202 within the processor 200 can include a seed 222 and a CA signature 226. The seed 222 is accessible only to the root-of-trust on the processor 200 (e.g., boot ROM 204) and are blown during manufacture. The vendor of the processor can determine a maximum number nMax of SVNs that will be supported during the lifetime of the processor 200. During production, the vendor's CA randomly generates a seed and writes the seed into the secure fuses 202 of the processor 200. The processor can then use the seed and apply a one-way function repeatedly for (nMax+1) and reach touchstone t, which is a public value signed by the vendor's CA. The signature for the touchstone value can be verified using the CA public key 424 that is included in the peripherals.

As shown in FIG. 2C, firmware 206 is loaded by boot ROM 204. As the firmware may be vulnerable, the firmware is versioned with an SVN and may be updated. Existing formats of credentials, such as an X.509 certificate, cannot be efficiently implemented within a processor, as the recovery of X.509 certificates requires the provisioning of the new credential from external sources, which is not independent. Alternatively, credentials for all SVNs can be stored in fuses. However, such solution is not scalable to a large number of potential SVNs. Instead, the boot ROM 204 can retrieve the seed 222 and generate new secrets 205 to supply to the firmware 206. The secrets are generated by the boot ROM based on the SVN of the firmware.

To implement a credential that is independently renewable upon firmware SVN upgrade, the credential must be generated by the ROM and it must be a function of the SVN.

Processor Credential Hash Chain

Figure 3A:
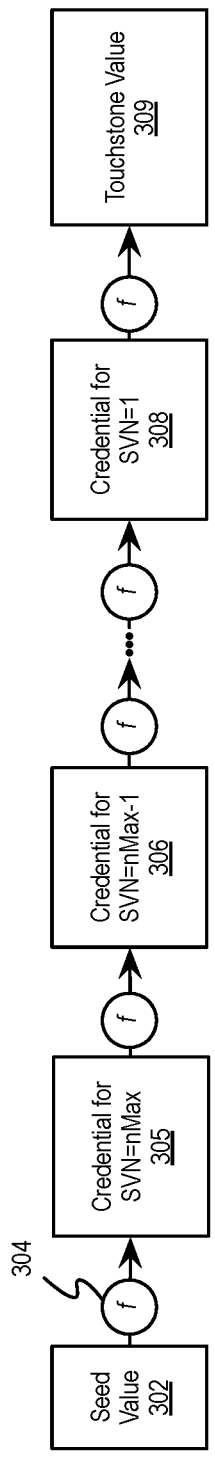
FIG. 3A-3C illustrate processor credential hash chains, according to embodiments described herein.
Figure 3B:
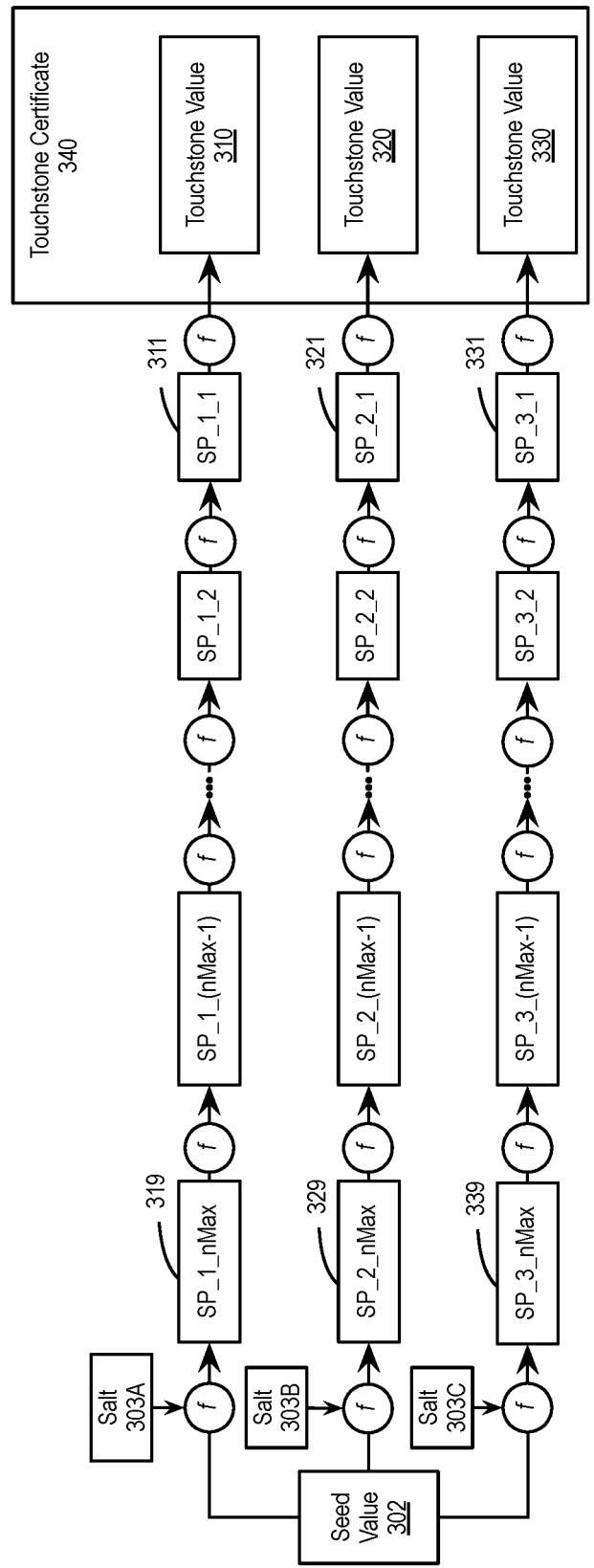
Figure 3C:
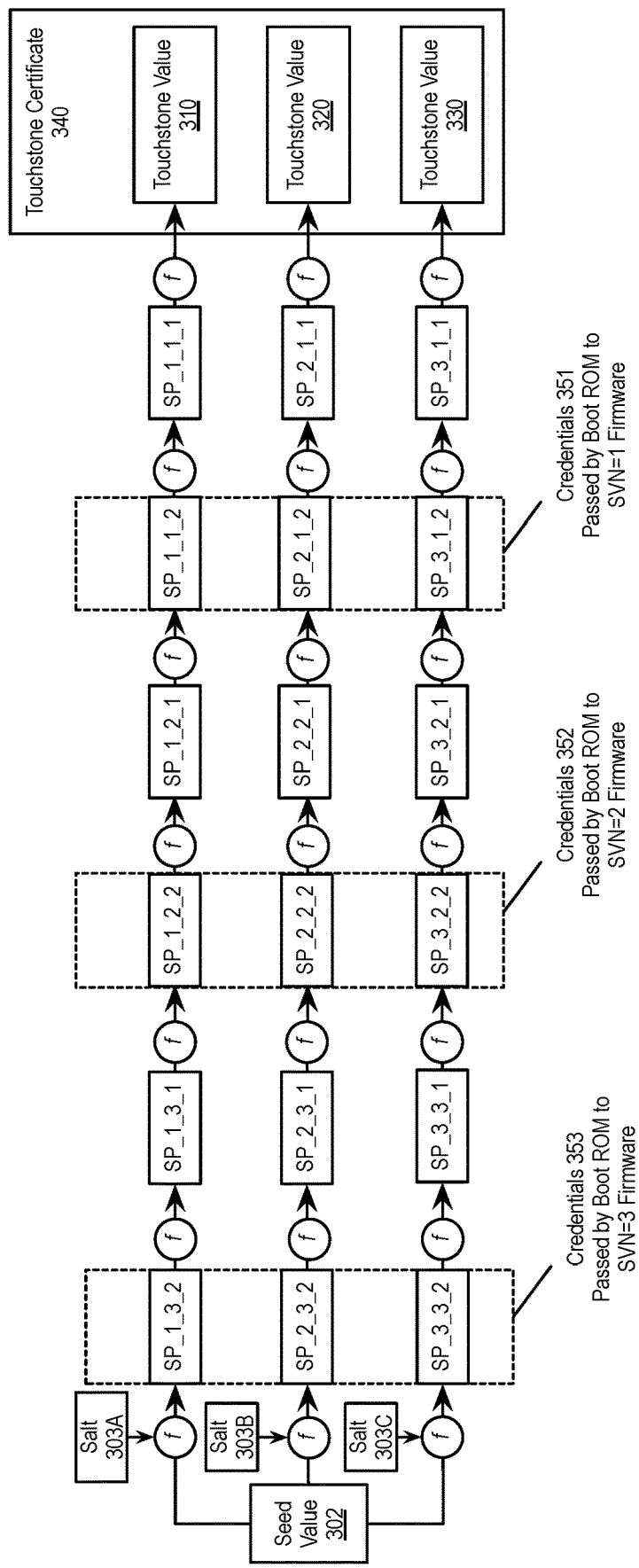

FIG. 3A-3C illustrate processor credential hash chains, according to embodiments described herein. FIG. 3A illustrates a one-dimensional hash chain. FIG. 3B illustrates a two-dimensional hash chain. FIG. 3C illustrates a three-dimensional hash chain. The number of dimensions used for a hash chain increases the flexibility of the credential system. A two-dimensional hash chain enables support of multiple peripheral peers. A three dimensional hash chain allows those peripheral peers to have multiple SVNs. While hash chains are described, any chain of values generated by a secure one-way function can be used.

As shown in FIG. 3A, and as described above, the processor vendor decides the maximum number (nMax) of SVNs to support in the lifetime of the processor. Starting from the seed value 302, the boot ROM of the processor can apply a one-way function $f$ 304 repeatedly for (nMax+1) times and reach touchstone value 309, which is a public value signed by the CA, where the CA's public key 424 is hardcoded within peripherals' code. One-way function $f$ 304 can be a secure one-way function, such as a cryptographic hash function. In one embodiment, one-way function $f$ 304 is a variant of the secure hash algorithm (SHA).

Every node in the chain is the credential for firmware of a specific SVN=n, which can be denoted as SP_n. For example, SP_nMax is the credential for SVN=nMax 305 and is the final credential for a processor before the firmware can no longer be updated. Thus, nMax will be selected to be a sufficiently large number. From the credential of a higher-SVN, one can derive the credential of a lower SVN, but not the reverse. Thus, the credential for SVN=nMax-1 306 (SP_(nMax-1)) can be derived from the credential for SVN=nMax 305. This chain can continue for each possible SVN value, though to the credential for SVN=1 308 (SP_1). Should firmware having SVN=1 be somehow compromised, this compromised firmware will not be able to generate credentials for successive firmware updates.

As shown in FIG. 3B a two-dimensional hash chain can be used to enable support of multiple peripheral peers. When establishing a secure session with a peer, the firmware sends its SVN n, SP_n, and its touchstone certificate to the peer (e.g., the peripheral). The peer first verifies the CA's signature on the touchstone, then performs iterative one-way (e.g., hash) operations, starting from SP_n, for n times. The peer successfully authenticates the firmware If and only if the result is equal to touchstone t.

To enable the two-dimensional hash chain, a different salt value 303A-303C can be used when generating the credentials for each peer based on the seed value 302. A dedicated hash chain is used for each peer to enable credential isolation, such that credentials for one compromised peer cannot be used to access the communications of other peers. SP_i_n can be used to denote the credential for peer i based on processor firmware SVN=n. SP_1_nMax 319, SP_2_nMax 329, and SP_3_nMax 339 represent the maximum credential version for each of the peers, which are each generated using the one-way function $f$ 304 based on the seed value 302 and an associated salt 303A-303C. Although three peripherals are illustrated, the second dimension can be used to represent any number of peripherals. Successive credentials in each independent hash chain can be generated based on repeated application of the one-way function $f$ 304. SP_1_(nMax-1) 319 can be repeatedly processed to arrive at credential SP_1_1 311. SP_2_(nMax-1) 329 can be repeatedly processed to arrive at credential SP_2_1 321. SP_3_(nMax-1) 339 can be repeatedly processed to arrive at credential SP_3_1 331. Each credential can be further processed using one-way function $f$ 304 to arrive at touchstone values 310, 320, 330 for each hash chain. The touchstone values are known values that can be used by the boot ROM to verify the validity of the seed value 302 and one-way function $f$. The peers can use the associated touchstone values 310, 320, 330 to verify the authenticity of the CPU firmware. In one embodiment, the firmware of the processor can generate a touchstone certificate 340 that includes the touchstone value 310, 320, 330 associated with each peripheral. The touchstone certificate can be signed by a CA, with the signature of the certificate (e.g., CA signature 226) stored in secure fuses.

The peripheral peers should be trusted before processor credentials are sent to the peers. Thus, each peer is authenticated with the processor before the peer specific processor credentials are sent to the peer. Additionally, the credentials are sent to the peer in an encrypted form that only the peer can decrypt. Furthermore, it may be desirable for the credentials used for communication between a processor and a peripheral be dependent based on the processor firmware SVN, but also the SVN of the peripheral or peripheral firmware. For example, if firmware on a peripheral is vulnerable and allows the leaking of supplied credentials, a new credential will be used for an updated peripheral SVN. In this scenario, a three-dimensional hash chain can be used, where credentials are determined based on peer i, processor SVN n, and peer SVN m, which can be denoted as SP_i_n_m. An exemplary three-dimensional hash chain is shown in FIG. 3C.

FIG. 3C shows an exemplary three-dimensional chain with three peers. The processor boot ROM passes SP_i_n_mMax (where mMax is the maximum SVN of the peer) specific to the processor firmware's SVN=n. The processor firmware runs iterative operations of the one-way function 304 starting from SP_i_n_mMax, for (mMax-m) times to reach SP_i_n_m, which is specific to the peer SVN=m. In this scenario, the boot ROM does not have knowledge of SVN=m for the peer. Thus, the boot ROM will pass SP_i_n_mMax to the firmware for each peripheral. Where processor nMax=3 and peer mMax=2, for processor firmware SVN=3, the boot ROM will pass credentials 353, which include SP_1_3_2 for peer 1, SP_2_3_2 for peer 2, and SP_3_3_2 for peer three. For processor firmware SVN=2, the boot ROM will pass credentials 352, which include SP_1_2_2 for peer 1, SP_2_2_2 for peer 2, and SP_3_2_2 for peer three. For processor firmware SVN=1, the boot ROM will pass credentials 351, which include SP_1_1_2 for peer 1, SP_2_1_2 for peer 2, and SP_3_1_2 for peer three. The firmware can derive the appropriate credentials for the current peer SVN=m based on the SVN provided by the peer during initial registration.

To verify an SP, after receiving SP_i_n_m and the touchstone certificate 340 from the processor, peer i first verifies the certificate and extracts the touchstone value $t_i$. The peer then iteratively performs the one-way function 304, starting from SP_i_n_m, for (m+(n−1)*mMax) times, and checks whether the result matches touchstone value $t_i$ (e.g., touchstone value 310 for peer 1, touchstone value 320 for peer 2, touchstone value 330 for peer 3). Although three peripherals are illustrated, the security protocol described herein is not limited to any specific number of peripherals.

Enabling the SPIRAL protocol on a processor and peer peripherals includes the use of a registration flow and an application flow. The registration flow runs when the processor and the peripheral communicate for the first time and upon firmware update with an SVN change on either or both of the processor and a peripheral. Thus, for a specific combination of processor SVN=n, peripheral SVN=m, the registration process only needs to execute once. Registration performs mutual authentication and results in a shared secret being stored by the Peripheral in non-volatile memory of the peripheral. Registration makes uses of asymmetric key cryptography. The application flow executes after the processor and peripheral have agreed on the shared secret in the registration flow. The application flow results in the generation of ephemeral session keys that are derived from the shared secret and nonces. The application flow does not use asymmetric key cryptography.

The shared secret between processor and peripheral is determined and derived by the processor. To prevent firmware rollback attacks, the derivation of shared secret includes the use of the processor firmware SVN. To handle the peripheral swapping scenario, the derivation of shared secret must include some unique characteristic if the peripheral, such as a device identifier or another characteristic that is unique to the specific peripheral. In one embodiment, the peripheral characteristic is a public key associated with the peripheral. The peripheral may also make use of a characteristic that is unique to the processor.

Figure 4:
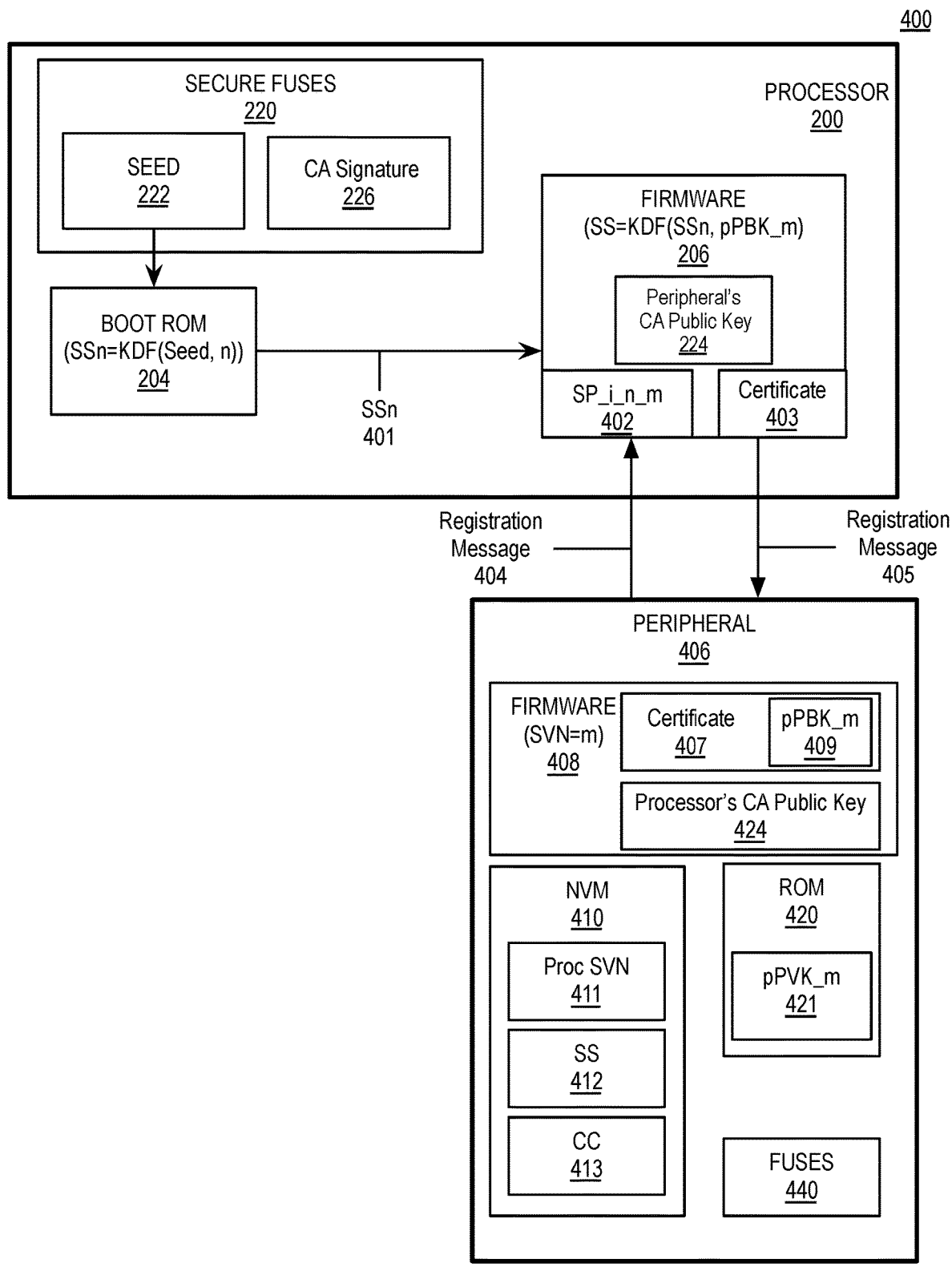
FIG. 4 illustrates a system to enable registration between a processor and a peripheral using a credential hash chain, according to an embodiment.

FIG. 4 illustrates a system 400 to enable registration between a processor and a peripheral using a credential hash chain, according to an embodiment. As discussed above, the processor 200, includes secure fuses 202, a boot ROM 204, and firmware 206 having an SVN (SVN=n). The secure fuses 202 includes a seed 222 and a CA signature 226. The firmware 206 on the processor 200 includes a certificate 403, which can include the touchstone certificate 340 as in FIG. 3B-3C. The peripheral 406 includes a firmware 408 having an SVN (SVN=m). The firmware 408 can include a peripheral certificate 407, which includes a peripheral public key pPBK_m 409. The peripheral public key pPBK_m 409 can be generated based on the peripheral 406 also include non-volatile memory (NVM 410) and read-only memory (ROM 420). The NVM 410 can be used to store data that is received or generated during the initial registration process. For example, the NVM 410 can store the SVN of the processor firmware 411 (SVN=n), the generated shared secret (SS 412), a unique processor characteristic (CC 413). The ROM 420 on the peripheral 406 includes a peripheral private key pPVK_m 421. The hardcoded CA public key 424 is the CA public key of the processor and it can be the same as the CA public key 224 (if the same CA signs processor's certificate and peripherals' certificates) within the firmware 206 of the processor 200. In one embodiment, at least some of the data used by the ROM is retrieved from fuses 440 on the peripheral 406. Some of the data used by the ROM can also be derived from a seed that is burned to a secure portion of the fuses. The seed may be burned to a portion of the fuses 440 that is accessible only by the ROM 420 of the peripheral 406. Additionally, the peripheral private key pPVK_m 421 may be derived by the ROM 420 based on a stored seed and the SVN of the peripheral 406.

The boot ROM 204, which has exclusive access to the seed 222 within the secure fuses 202, can read the seed value and generate a bound shared secret (SSn 401) using the seed value. The boot ROM 204 can receive the SVN of the firmware 206 or otherwise determine the SVN of the firmware. The boot ROM 204 then generates SSn 401 based on the SVN of the firmware (e.g., SSn=KDF(Seed, n)). The SSn 401 is bound to the SVN of the firmware and will be different for each SVN. SSn 401 is transmitted by the boot ROM 204 to the firmware 206, along with credential SP_i_n_mMax. The firmware 206 can then generate a shared secret (SS=KDF(SSn, pPBK_m)), where which is based on SSn 401 received from the boot ROM 204 and pPBK_m is the public key associated with the peripheral that is received from the peripheral 406. pPBK_m 409 can be used as the unique characteristic of the peripheral. The firmware 206 also generates SP_i_n_m 402 using the peripheral firmware SVN=m that is received from the peripheral 406.

In one embodiment the registration process includes for the firmware 408 of the peripheral 406 first registration message 404 that is sent by the peripheral 406 to the processor 200. The first registration message 404 includes value m, which is the SVN of the peripheral 406, certificate 407, and a nonce value (pNonce). The certificate 407 includes pPBK_m 409, which firmware 206 can use to generate SS 412 (e.g., SS=KDF(SSn, pPBK_m)). Firmware 206 can authenticate the peripheral 406 by verifying the signature on certificate 407 using the CA public key 224. Once the peripheral 406 is determined to be authentic, firmware 206 can generate credential SP_i_n_m 402 and send a second registration message 405 that is encrypted using pPBK_m 409. The second registration message 405 can include, in encrypted form: certificate 403; credential SP_i_n_m 402, which is based on peripheral id i, SVN=n of the processor 200, and SVN=m of the peripheral 406; SS 412; and pNonce. The second registration message can also include the values of the peripheral id i, SVN value n, and SVN value m, which are used to derive SP_i_n_m 402.

Figure 5:
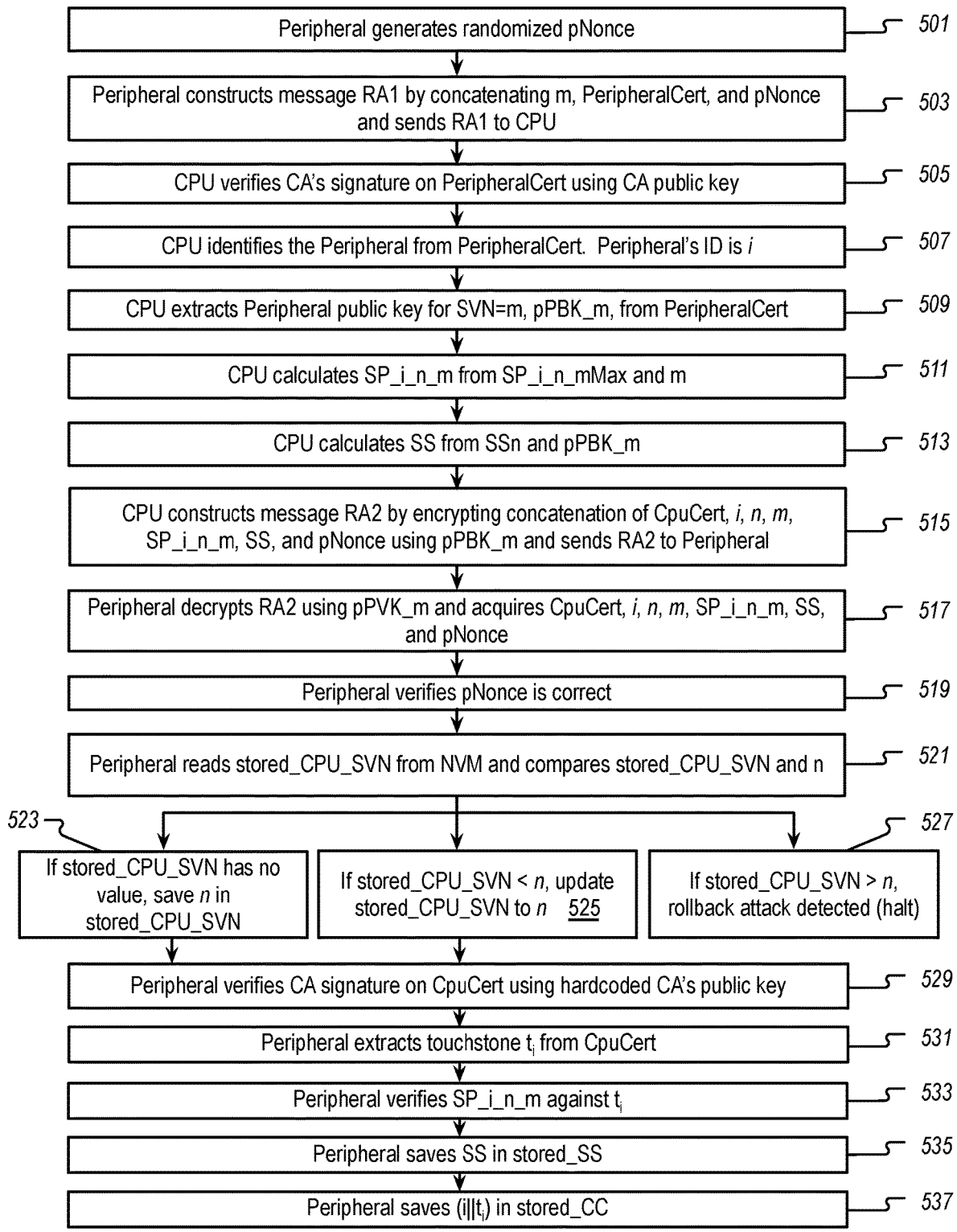
FIG. 5 illustrates method of registration between a peripheral and a processor, according to an embodiment.

FIG. 5 illustrates method of registration between a peripheral and a processor, according to an embodiment. The method of FIG. 5 can be performed by firmware on the processor and firmware, or other logic, on the peripheral. In FIG. 5 and the associated description, the processor is referred to generally as a central processing unit (CPU), although the techniques described are not limited to any specific type of processor and can be implemented within other types of processors, such as a graphics processor, MIC processor, or FPGA. As a prerequisite to the operations, peripheral firmware SVN=m has a private key pPVK_m (e.g., pPVK_m 421 of FIG. 4) received from peripheral ROM and a peripheral certificate PeripheralCert (e.g., certificate 407 of FIG. 4), which includes peripheral public key pPBK_m (e.g., pPBK_m 409 of FIG. 4). Additionally, CPU firmware SVN=n has SP_i_n_mMax from the boot ROM of the CPU and CpuCert, which is a CPU certificate (e.g., certificate 403 of FIG. 4) generated by the firmware that the touchstone certificate 340 described above. The CPU firmware also has SSn (e.g., SSn 401), which is received from the boot ROM of the CPU.

In one embodiment, the registration method can include for the peripheral to generate a randomized value pNonce (block 501). The peripheral constructs message a first registration message RA1 (e.g., registration message 404 as in FIG. 4) by concatenating m, PeripheralCert, and pNonce (block 503). The peripheral then sends RA1 to the CPU.

The CPU verifies the CA's signature on PeripheralCert using the CA public key (block 505). The CA public key can be the hardcoded CA public key 224 within the firmware 206 of the processor 200, as described above. The CPU can identify the peripheral from PeripheralCert (block 507), where the peripheral identifier is data value i. The CPU can extract the peripheral public key for SVN=m and pPBK_m from PeripheralCert (block 509) and calculate SP_i_n_m from SP_i_n_mMax and m (block 511). The CPU can then calculate SS from SSn and pPBK_m (block 513). The CPU then constructs message RA2 (e.g., registration message 405 as in FIG. 4) by encrypting the concatenation of CpuCert, i, n, m, SP_i_n_m, SS, and pNonce using pPBK_m as a key (block 515). The CPU then sends RA2 to the peripheral.

The peripheral can then decrypt RA2 using pPVK_m and acquire CpuCert, i, n, m, SP_i_n_m, SS and pNonce (block 517). The peripheral can then verify that the pNonce is correct (block 519). Once verified, the peripheral reads the stored_CPU_SVN from NVM and compares the stored_CPU_SVN and value n (block 521). The comparison is to detect a rollback attack in which the CPU firmware was downgraded to a lower SVN. If the stored_CPU_SVN has no value, the peripheral will save n in stored_CPU_SVN (block 523). If the stored_CPU_SVN<n, the peripheral will update stored_CPU_SVN to value n (block 525). If the stored_CPU_SVN>n, then a rollback attack is detected (block 527). The peripheral will then halt the registration operations in response to detection of a rollback attack to prevent registering with a potentially compromised CPU.

The peripheral can then proceed to verify the CA signature on the CpuCert using a hardcoded CA public key (e.g., CA public key 424) within the peripheral (block 529). The peripheral can then extract touchstone $t_i$ from CpuCert (block 531) and verify SP_i_n_m against $t_i$ (block 533) by repeated application of the one-way function. If SP_i_n_m is verified, the peripheral can save SS in stored_SS (e.g., SS 412 as in FIG. 4) (block 535). The peripheral can then save (i||$t_i$) in the stored_CC (e.g., CC 413 as in FIG. 4) (block 537). The failure of any one of the above operations results in the abortion of the registration flow.

On-Die Certificate Chain for Processors

The credential hash chain can be used on a processor that lacks native support for functionality such as non-volatile memory or network connectivity. The peripheral device, which may not have such limitations, can make use of on die-certificates. However, when a credential hash chain is used on a processor, the number of peripherals that can be securely paired with the processor, as well as the maximum number of firmware SVNs, is determined at the time of manufacturing for the processor. In one embodiment, a technique is provided in which a processor can also be configured to also make use of on-die certificates, which overcomes the extendibility limitations of the credential hash chain, at the cost of greater computational expense.

In such embodiment, the random seed in the secure fuses is used to derive an ECC or RSA private key that is served as the ROM CA private key. The corresponding ROM CA public key in a ROM CA certificate is signed by the vendor's root CA and the signature is written to fuses within the processor. The ROM derives the SPIRAL protocol private key from the seed and firmware SVN. For each SVN a different protocol private key will be generated, enabling independent credential renewal upon firmware SVN update. The ROM derives a protocol public key from the private key, constructs a protocol certificate, and signs the protocol certificate with the ROM CA private key. The protocol private key and the protocol certificate are passed to firmware.

During session establishment, the firmware sends the certificate chain (ROM CA certificate and protocol certificate) to the peer. The peer first verifies the ROM CA certificate using hardcoded vendor root CA public key, and then uses the ROM CA public key to verify the protocol certificate provided by the processor. Once data from the processor is verified, the peer takes the subject public key of the processor firmware certificate to set up secure session with the peripheral. While the use of an on-die certificate chain is more computationally expensive, use of the on-die certificate chain removes the restriction on number of peripherals and the maximum SVN of peripherals.

Figure 6:
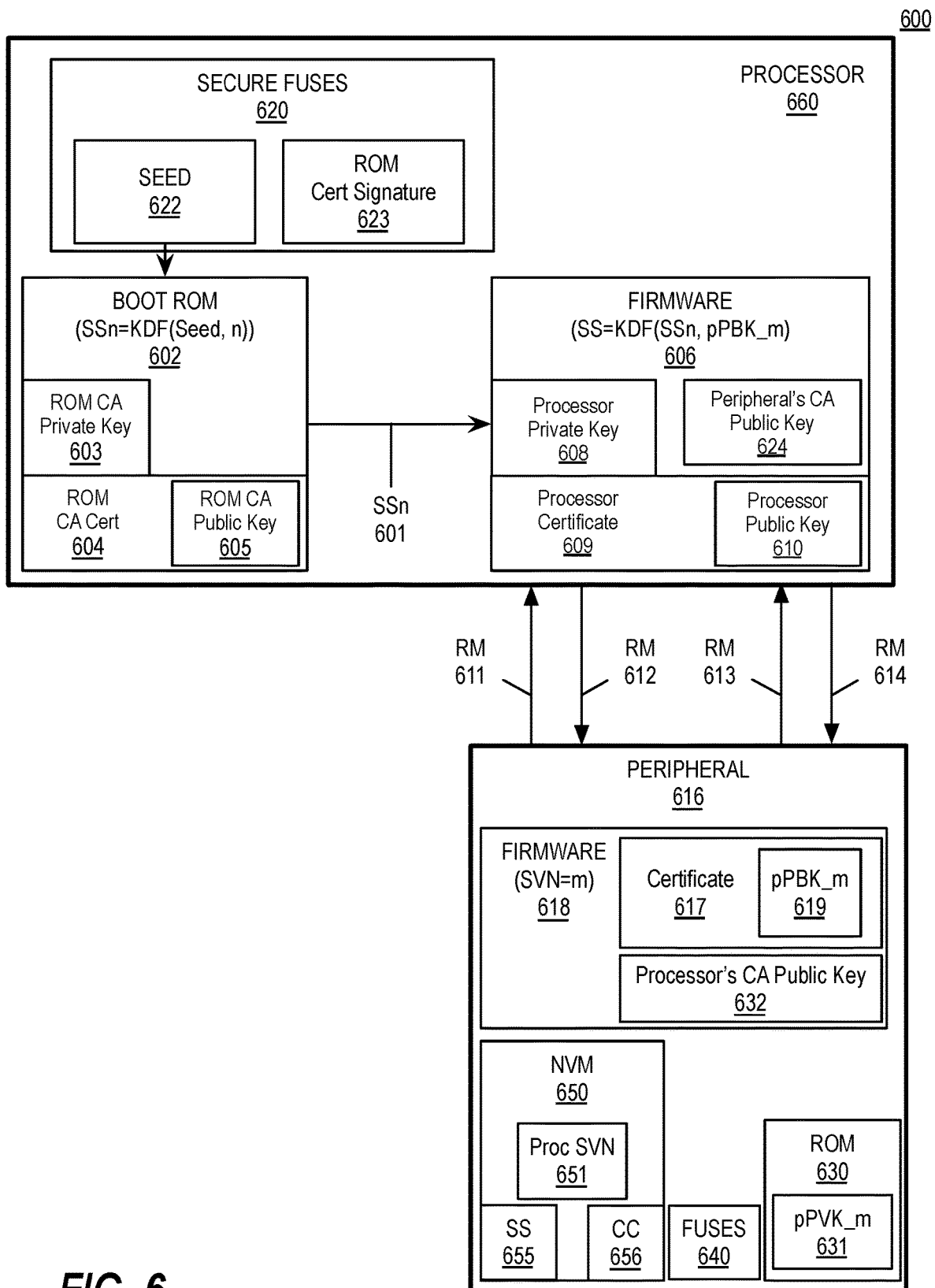
FIG. 6 illustrates a system to enable registration between a processor and a peripheral using an on-die certificate chain, according to an embodiment.

FIG. 6 illustrates a system 600 to enable registration between a processor and a peripheral using an on-die certificate chain, according to an embodiment. The system 600 includes a processor 660 that may be substantially similar in operation as processors 102 and processor 200 described herein and can include similar components. Processor 660 includes secure fuses 620, which store a seed 622 accessible only to the boot ROM 602. The secure fuses 620 can also store a ROM certificate signature 623. A peripheral's CA public key 624 can be stored in the firmware 606 on the processor 660. The boot ROM 602 includes a ROM CA private key 603 and a ROM CA certificate 604. The ROM CA certificate 604 includes a ROM CA public key 605. The seed 622 in the secure fuses 620 is used to derive the ROM CA private key 603 of asymmetric crypto schemes such as but not limited to an ECC or RSA. The ROM CA public key 605 in the ROM CA certificate 604 is signed by the vendor's root CA to generate the ROM certificate signature 623, which is written to the secure fuses 620. The boot ROM 602 derives the protocol private key for the processor (e.g., processor private key 608) from the seed 622 and firmware SVN. For each SVN a different processor private key 608 will be generated, enabling independent credential renewal upon firmware SVN update. The boot ROM 602 derives the protocol public key for the processor (processor public key 610) from the ROM CA private key 603, constructs a protocol certificate (processor certificate 609), and signs the protocol certificate with the ROM CA private key 603. The processor private key 608 and the processor certificate 609 (which includes the processor public key 610) are then passed to the firmware 606. As with the hash chain described above, the boot ROM 602 can also derive an SSn 601 to supply to the firmware 606, which can also be used to generate a shared secret to be stored by the peripheral 616 (e.g., SS 655).

The peripheral 616 can include similar components as peripheral 406 of FIG. 4. The firmware 618 of the peripheral has an SVN (SVN=m) and stores a certificate 617 that includes a peripheral public key pPBK_m 619. The firmware 618 can also include a hardcoded processor's CA public key 632, which can be the same as the peripheral's CA public key 624. NVM 650 can be used to store the SVN of the processor 660 (e.g., SVN=n), along with the shared secret (SS 655) generated during registration. A unique processor characteristic (CC 656) can also be stored in the NVM 650. The ROM 630 of the peripheral 616 includes a peripheral private key (pPVK_m 631). Additionally peripheral private key pPVK_m 631 may be generated by the ROM 630 based on a seed stored in the fuses 640 and the firmware SVN m. The ROM 630 may then generate peripheral public key pPBK_m 619 based on pPVK_m 631.

Peripheral 616 uses a different registration and validation process, relative to the processor credential hash chain, when the on-die certificate chain is in use. In one embodiment the peripheral 616 and the processor 660 can exchange four registration messages (RM 611, 612, 613, 614) to enable mutual authentication and registration. Details of the registration process for the one-die certificate chain are shown in FIG. 7A-7B.

Figure 7A:
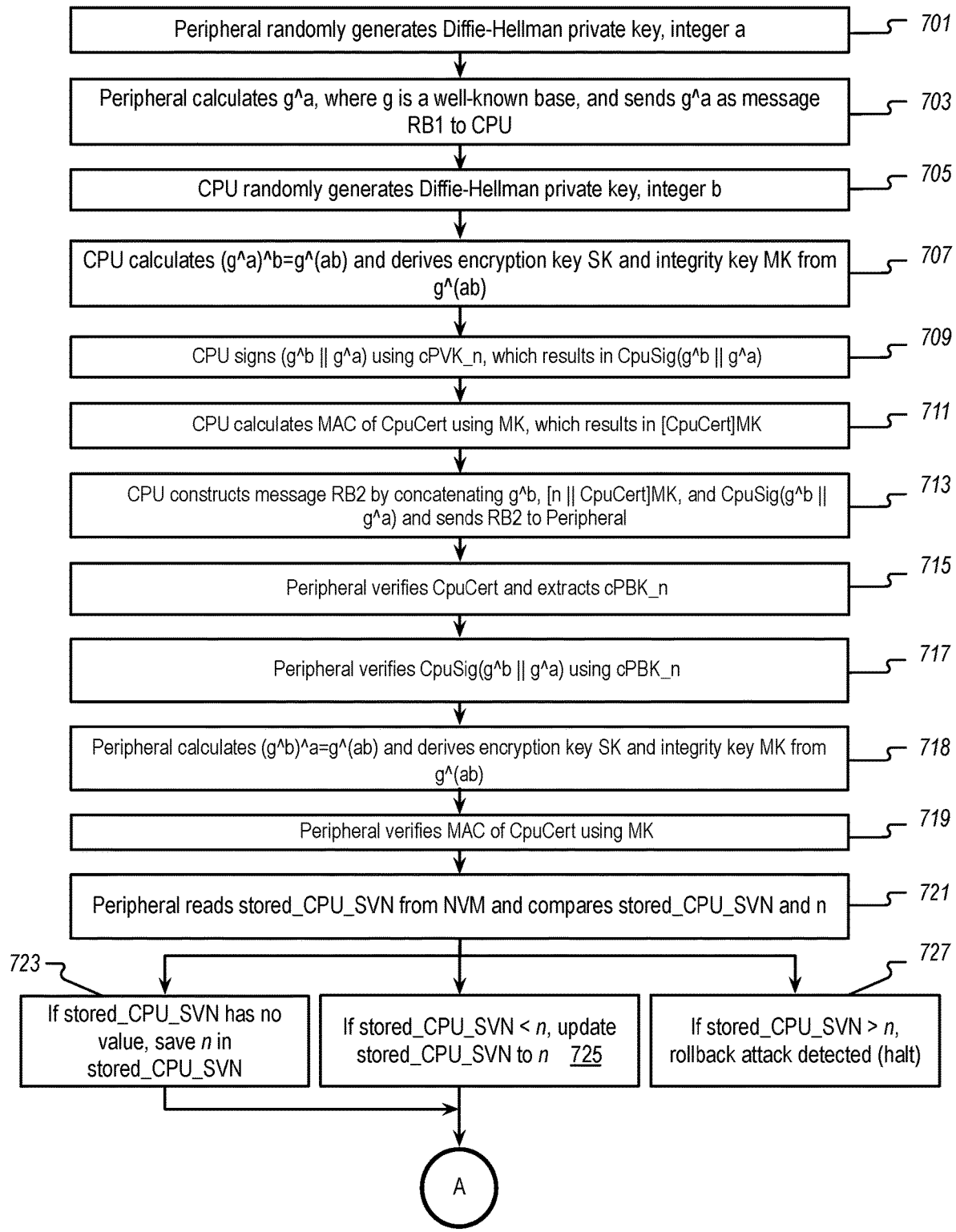
FIG. 7A-7B illustrates a method of registration between a processor and a peripheral using an on-die certificate chain, according to an embodiment.
Figure 7B:
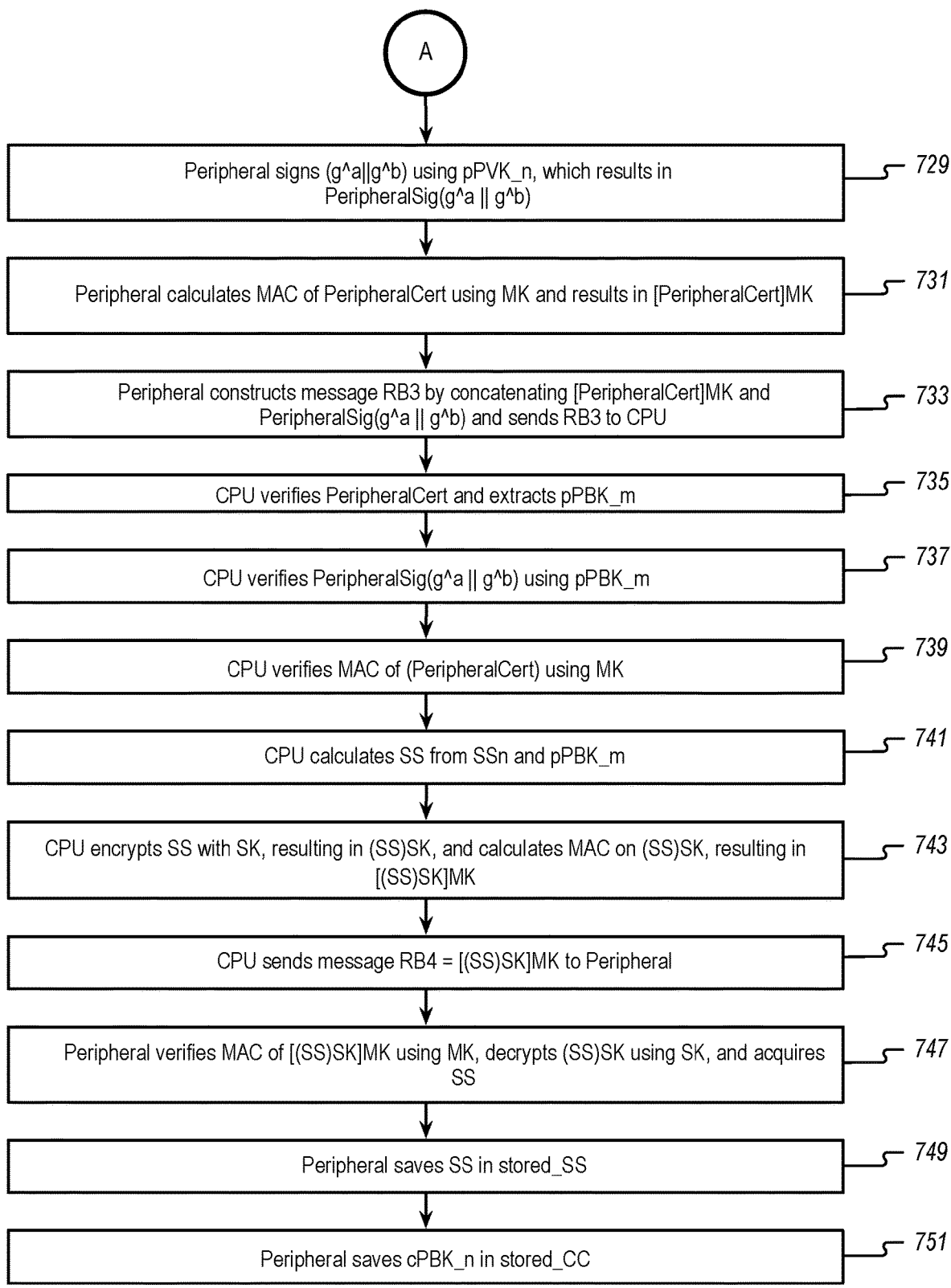

FIG. 7A-7B illustrates a method of registration between a processor and a peripheral using an on-die certificate chain, according to an embodiment. In one embodiment the processor and the peripheral can use Diffie-Hellman key exchange as part of the registration process. In one embodiment, elliptic curve Diffie-Hellman is used. In FIGs. 7A-7B and the associated description, the processor is referred to generally as a central processing unit (CPU), although the techniques described are not limited to any specific type of processor and can be implemented within other types of processors, such as a graphics processor, MIC processor, or FPGA. In the description below a||b indicates to concatenate data string b after a, (a)k1 indicates ciphertext of plaintext an encrypted using key k1, and [a]k2 indicates a||MAC (message authentication code) of a using key M.

As shown in FIG. 7A, to begin the method the peripheral can randomly generate a Diffie-Hellman private key, a randomized integer value a (block 701). The peripheral can then calculate g^a, where g is a well-known base, and send g^a as message RB1 (e.g., RM1 611 of FIG. 6) to the CPU (e.g., processor 660) (block 703). Well-known base g, in one embodiment, can be an ECC generator base point. The CPU can randomly generate Diffie-Hellman private key, randomized integer b (block 705). The CPU then calculates (g^a)^b=g^(ab) and derives encryption key SK and integrity key MK from g^(ab) (block 707). The CPU can then sign (g^b||g^a) using cPVK_n 608, which results in CpuSig (g^b||g^a) (block 709). The CPU can then calculate the MAC of CpuCert using integrity key MK, which results in [CpuCert]MK (block 711). The CPU then constructs message RB2 (e.g., RM 612 of FIG. 6) by concatenating g^b, [n||CpuCert]MK, and CpuSig(g^b||g^a) and sends RB2 to Peripheral, where n is the CPU SVN (block 713).

The peripheral then verifies CpuCert and extracts cPBK_n 610 (block 715). The peripheral can further verify CpuSig (g^b||g^a) using cPBK_n (block 717). The peripheral can then calculate (g^b)^a=g^(ab) and derive encryption key SK and integrity key MK from g^(ab) (block 718). The peripheral can then verify the MAC of CpuCert using MK (block 719). The peripheral can read the stored_CPU_SVN from NVM and compare the stored_CPU_SVN and n to detect a rollback attack where the CPU firmware was downgraded to a lower SVN (block 721). If the stored_CPU_SVN has no value, the peripheral can save n in stored_CPU_SVN (e.g., proc SVN 651 of FIG. 6) (block 723). If the stored_CPU_SVN<n, the peripheral can update the stored_CPU_SVN to n. However, if the stored_CPU_SVN>n, a rollback attack has been detected and the method will halt (block 727). Operations then proceed to FIG. 7B.

As shown in FIG. 7B, the peripheral can sign (g^a||g^b) using pPVK_m 631, which results in PeripheralSig(g^a||g^b) (block 729). The peripheral then calculates the MAC of PeripheralCert using integrity key MK, which results in [PeripheralCert]MK (block 731). The peripheral constructs message RB3 (e.g., RM 613 of FIG. 6) by concatenating [PeripheralCert]MK and PeripheralSig(g^a||g^b) and sends RB3 to the CPU (block 733).

The CPU can verify PeripheralCert and extract pPBK_m (735). The CPU then verifies PeripheralSig(g^a||g^b) using pPBK_m (block 737). The CPU then verifies the MAC of (PeripheralCert) using integrity key MK (block 739). The CPU then calculates SS from SSn and pPBK_m (block 741). The CPU can then encrypt SS with SK, resulting in (SS)SK, and calculates the MAC on (SS)SK, resulting in [(SS)SK] MK (block 743). The CPU then sends message RB4=[(SS) SK]MK to the peripheral, where RB4 is RM 614 of FIG. 6 (block 745).

The peripheral then verifies MAC of [(SS)SK]MK using integrity key MK, decrypts (SS)SK using SK, and acquires SS (block 747). The peripheral saves SS in stored_SS (block 749), where stored_SS is, for example, SS 655 of FIG. 6. The peripheral also saves cPBK_n in stored_CC (block 751), where stored_CC is, for example, CC 656 of FIG. 6. The failure of any one of the above operations results in the abortion of the registration flow.

Consolidated Certificate

In some embodiments, in addition to the credential hash chain and on-die certificate techniques, a consolidated certificate can be used. The consolidated certificate contains mMax public keys, one for each firmware SVN. The CA generates mMax private keys using ECC or RSA from a random seed blown into secure fuses and mMax different SVN values. The CA can sign the mMax public keys in the consolidated certificate, with the signature also blown to the secure fuses. The ROM can derive the private key from the seed in fuses and the loaded firmware SVN. Independent recovery of credentials upon SVN update is achieved as the private key output from ROM to firmware is based on the firmware's SVN. Other (mMax-1) private keys are not disclosed to the firmware.

TABLE 1

Consolidated Certificate

Certificate Body
   Number of public keys, mMax
   Metadata
   Subject public key #1
   Subject public key #2
   ...
   Subject public key # mMax
   CA signature algorithm
   CA signature on Certificate Body As shown in Table 1 above, the size of a consolidated certificate is proportional to mMax and can become very large. To address the size issue, an optimized consolidated certificate builds a Merkle hash tree with the mMax public keys, where neighboring two nodes are concatenated and hashed. The CA can then sign the root of the tree at top. To use a specific public key in a secure session, only the public key itself and select nodes in the Merkle tree are sent to the peer, which significantly reduces the amount of data transmission for the Peripheral's consolidated certificate. The consolidated certificate technique can be used by a processor or firmware.

Application Flow

The application flow between a processor and a peripheral is similar whether credential hash chains or on-die certificates are used for registration between the processor and the peripheral. Credentials resulting from the registration process can be used to generate ephemeral keys that are used to secure communications between a processor and a securely connected peripheral.

Figure 8A:
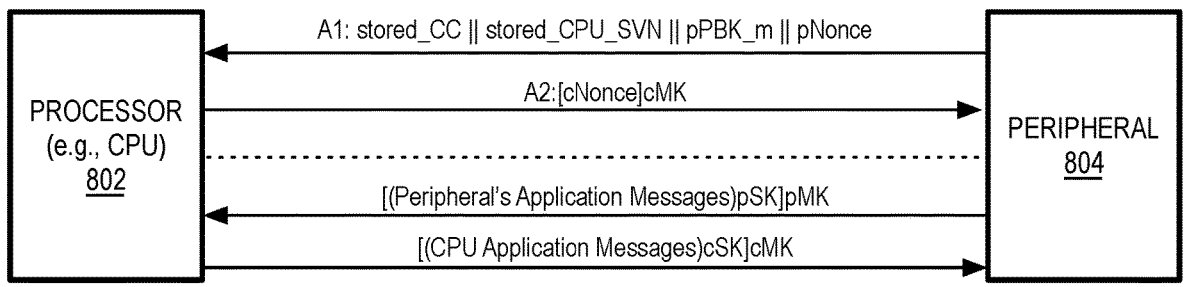
FIG. 8A-8B illustrate secure communication application flow sequence diagram and system, according to embodiments.
Figure 8B:
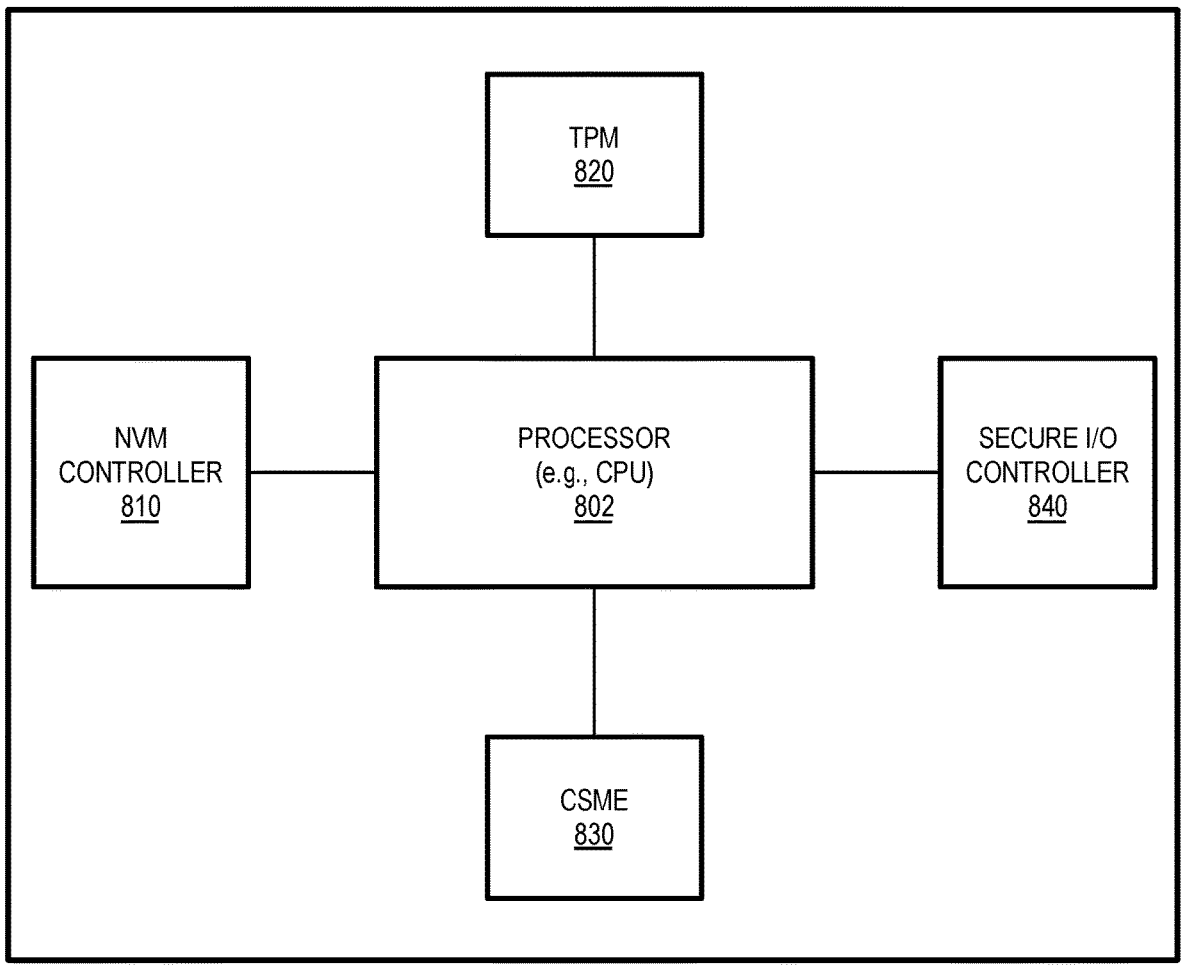

FIG. 8A-8B illustrate secure communication message flow and system, according to embodiments. FIG. 8A illustrates a message exchanged during establishment and operation of an application flow for secure messaging between a processor and peripherals. FIG. 8B illustrates a system in which peripherals are securely connected to a processor.

As shown in FIG. 8A, a processor 802 and a peripheral 804 can establish a secure communication session by mutually authenticating one another via credentials that are generated and stored during registration. The credentials are specific to the SVN of the firmware on the processor and peripheral. The credentials can be used to compute a set of ephemeral keys that are used secure and authenticate messages via symmetric key cryptography. Before application flow operations begin, the peripheral 804 can ensure that the peripheral firmware has validly read stored_CC, stored CPU_SVN, and stored_SS values from non-volatile memory. If any of these values are missing the peripheral may re-run registration. Furthermore, the peripheral firmware will retrieve public key pPBK_m from peripheral ROM. Firmware on the processor 802 will have stored either a touchstone certificate storing touchstone values for each peripheral, or a certificate including public key cPBK_n received from the boot ROM of the processor. The processor 802 will also have value SSn, received from the boot ROM of the processor, which is dependent upon the SVN of the processor firmware.

The peripheral 804 can construct a first message A1 by concatenating stored values CC, CPU_SVN, and pPBK_m, with a randomly generated nonce value pNonce. The stored values are the stored values illustrated in the peripherals above (e.g., CC 413, processor SVN 411, pPBK_m 409 of peripheral 406 as in FIG. 4; CC 656, processor SVN 651, pPBK_m 619 of peripheral 616 as in FIG. 6). The peripheral then sends A1 801 to the processor 802. Message A1 enables the security protocol described herein to work with NVM-less processors. The transmitted elements in message A1 801 prompts the processor to reconstruct the correct shared secret (e.g., SS 412; SS 655) previously sent to the peripheral 804 during registration. The processor 802 can also verify that the CC value matches $t_i$ if credential hash chains are in use on the processor 802 or cPBK_n if on-die certificates are in use on the processor 802. A mismatch implies that the processor has been swapped and the registration process should be re-run.

If the CC value matches, the processor 802 can randomly generate a nonce value cNonce and calculates integrity key cMK from SS and pNonce. The processor 802 can then calculate a MAC of cNonce using cMK ([cNonce]cMK) to generate message A2. The processor then sends message A2 to the peripheral 804. The peripheral 804 can then calculate cMK from SS and pNonce and verifies the MAC of cNonce using cMK. If cNonce is valid, the peripheral 804 and the processor 802 can enter into secure communication. Messages can be encrypted via encryption keys pSK and cSK. Messages can be authenticated and protected via pMK and cMK. The processor 802 and peripheral 804 calculate cMK to send and authenticate message A2. The processor 802 and the peripheral 804 can additionally compute: pSK from SS and cNonce; cSK from SS and pNonce; and pMK from SS and cNonce. This set of ephemeral keys can be used to protect application messages exchanged between the processor 802 and the peripheral 804 without directly using SS. For example, the peripheral 804 can secure application messages by encrypting the messages using encryption key pSK, with a MAC of the encrypted message computed based on integrity key pMK, as indicated by the notation [(Peripheral's Application Messages)pSK]pMK. The processor 802 can decrypt and authenticate the received message via pSK and pMK. The processor 802 can send application messages to the peripheral by encrypting the messages using encryption key cSK, with a MAC of the encrypted message computed based on integrity key cMK, as indicated by the notation [(CPU's Application Messages)cSK]cMK. The peripheral 804 can decrypt and authenticate the received message via cSK and cMK. The ephemeral keys can be renewed by rerunning the Application flow every certain period of time or amount of usage. The application flow for the processor 802 and the peripheral 804 is described in further detail in FIG. 9.

As shown in FIG. 8B, the processor 802 can be a central processing unit (CPU) configured to establish secure communications with multiple peripherals, such as but not limited to a non-volatile memory controller (NVM controller 810), a trusted platform module (TPM 820), a converged security and management engine (CSME 830), and/or a secure I/O controller 840, such as but not limited to a Thunderbolt, peripheral component interconnect express (PCIe), or universal serial bus (USB) controller that is configured to security communicate with the CPU.

Figure 9:
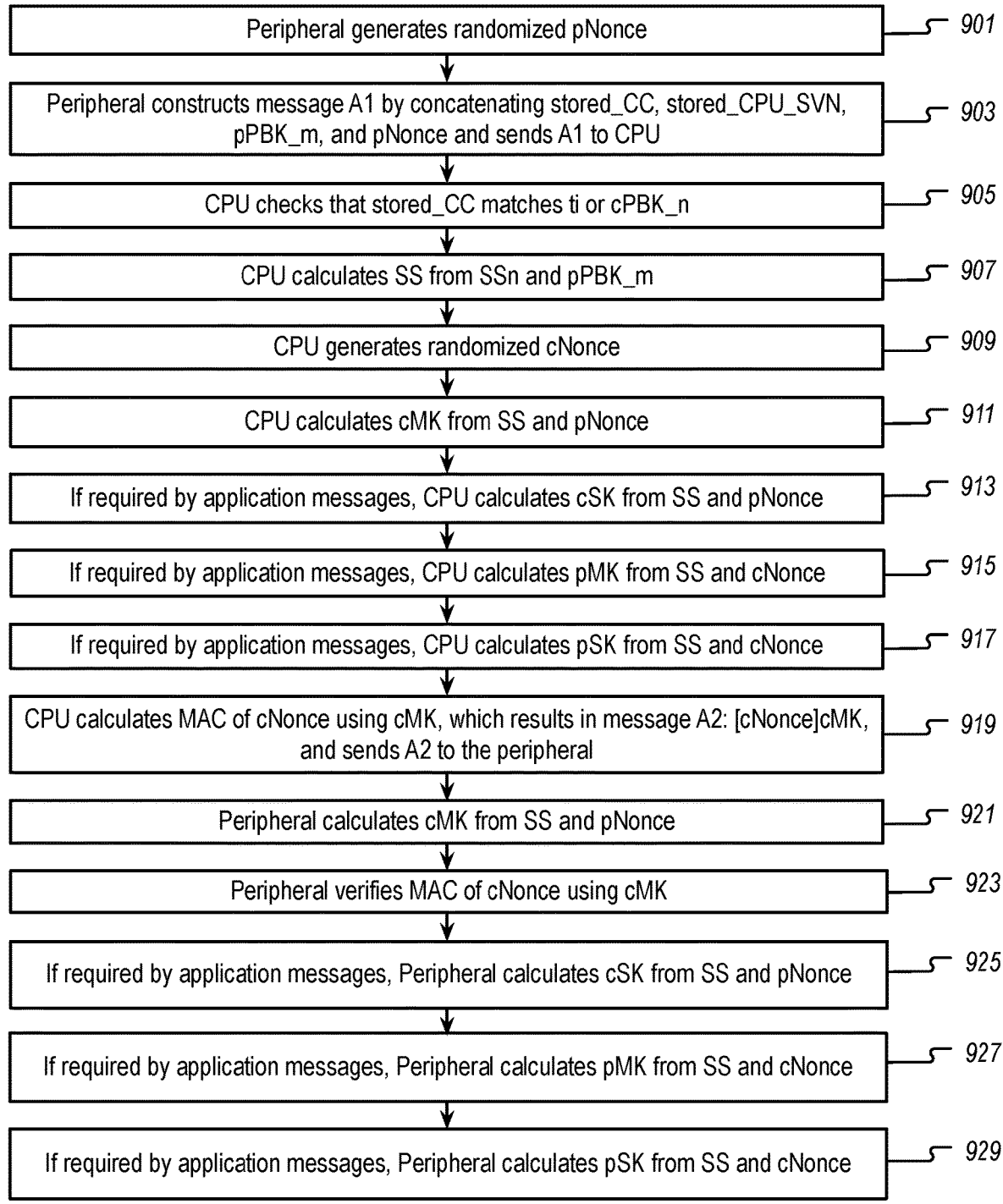
FIG. 9 illustrates operations of an application flow between a processor and a peripheral, according to an embodiment.

FIG. 9 illustrates operations of an application flow between a processor and a peripheral, according to an embodiment. The application flow is performed after registration operations are performed to generate processor and peripheral credentials and a shared secret. The processor and peripheral credentials are used to generate encryption and message integrity keys that are used to secure application messages. While the processor is referred to as a CPU below, operations are not limited to a central processing unit, and other types of processors may use the techniques described herein.

To initiate operations, the peripheral can generate a randomized nonce value pNonce (block 901). The peripheral can then construct message A1 by concatenating stored_CC, stored_CPU_SVN, pPBK_m, and pNonce and send A1 to CPU (block 903). Receipt of elements stored_CC, stored_CPU_SVN, and pPBK_m prompts the CPU to reconstruct the correct SS previously sent to the peripheral during registration. The CPU then checks that stored_CC matches $t_i$ (for credential-hash chain) or cPBK_n (for on-die certificate) (block 905). A mismatch implies that the CPU has been swapped and the CPU should signal the peripheral to re-run the registration process.

If stored_CC matches $t_i$, the CPU calculates SS from SSn and pPBK_m (block 907). The CPU can then generate randomized nonce value cNonce (block 909). The CPU then calculates cMK from SS and pNonce (block 911). If required by application messages, the CPU calculates cSK from SS and pNonce (block 913). If required by application messages, the CPU calculates pMK from SS and cNonce (block 915). If required by application messages, the CPU calculates pSK from SS and cNonce (block 917). The CPU calculates MAC of cNonce using cMK, which results in message A2:[cNonce]cMK, and sends A2 to the peripheral (block 919).

At the peripheral, the peripheral can calculate cMK from SS and pNonce (block 921). The peripheral then verifies MAC of cNonce using cMK (block 923). If required by application messages, the peripheral calculates cSK from SS and pNonce (block 925). If required by application messages, the peripheral calculates pMK from SS and cNonce (block 927). If required by application messages, the peripheral calculates pSK from SS and cNonce (block 929). Depending on the configuration, the application messages may not require encryption or message integrity authentication, so one or more of cSK, pMK, or pSK may not be generated if not required. Even if encryption and/or message integrity authentication are disabled, the CPU and the peripheral can benefit from the mutual authentication performed at the beginning of the application flow.

Figure 10:
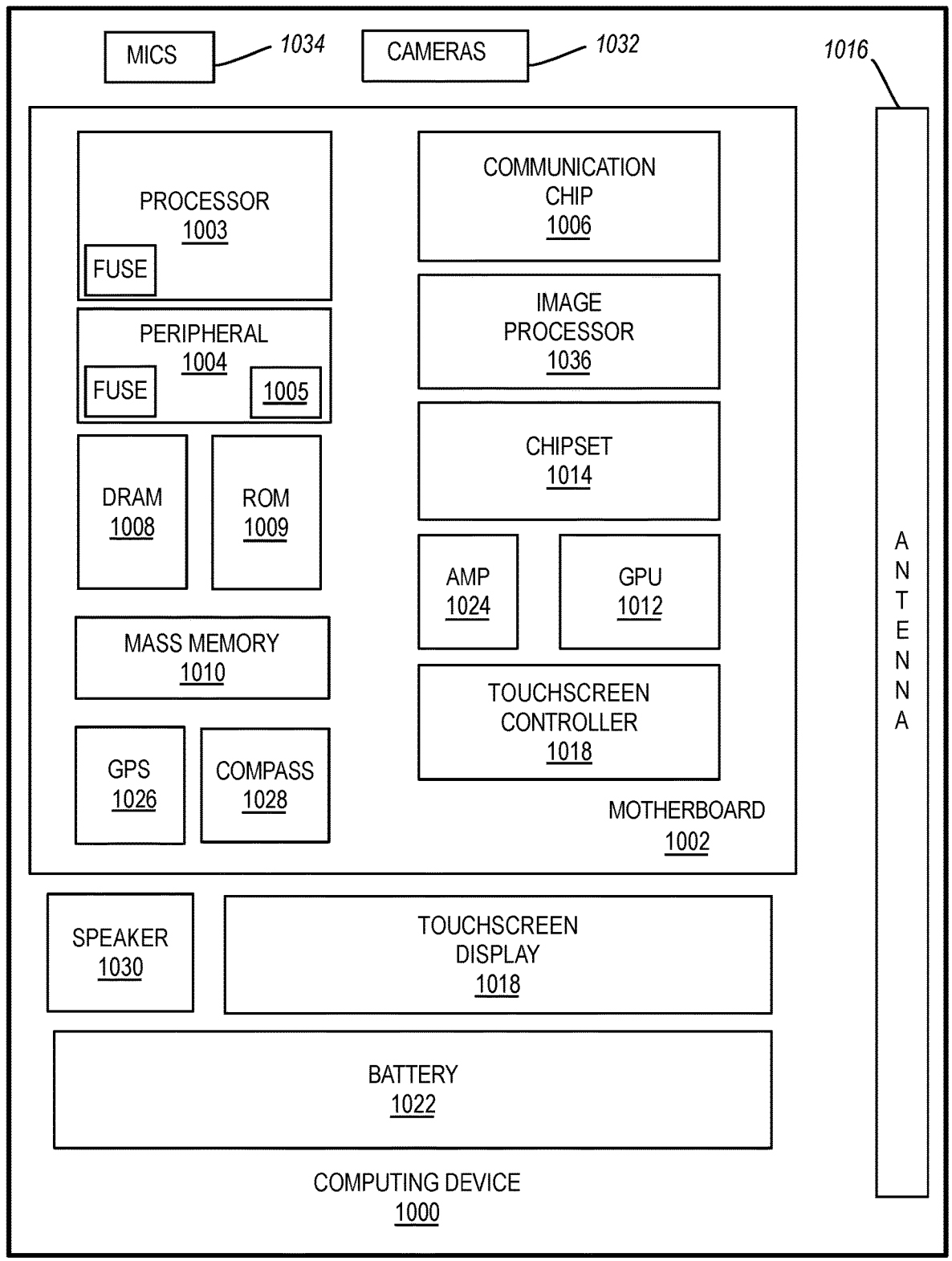
FIG. 10 illustrates a computing device in accordance with one implementation.

FIG. 10 illustrates a computing device 1000 in accordance with one implementation. Computing device 1000 houses a system board 1002. The board 1002 may include a number of components, including but not limited to a processor 1003 and at least one communication package 1006. The communication package is coupled to one or more antennas 1016. The processor 1003 is physically and electrically coupled to the board 1002.

The processor can be in communication with a peripheral 1004, which can be, for example, a security module or a trusted platform module. As described above, the processor 1003 and peripheral 1004 can each include fuses having security credentials burned therein. The peripheral can also include non-volatile memory 1005.

Depending on its applications, computing device 1000 may include other components that may or may not be physically and electrically coupled to the board 1002. These other components include, but are not limited to, volatile memory (e.g., DRAM) 1008, non-volatile memory (e.g., ROM) 1009, flash memory (not shown), a graphics processor 1012, a digital signal processor (not shown), a crypto processor (not shown), a chipset 1014, an antenna 1016, a display 1018 such as a touchscreen display, a touchscreen controller 1020, a battery 1022, an audio codec (not shown), a video codec (not shown), a power amplifier 1024, a global positioning system (GPS) device 1026, a compass 1028, an accelerometer (not shown), a gyroscope (not shown), a speaker 1030, cameras 1032, a microphone array 1034, and a mass storage device (such as hard disk drive) 1010, compact disk (CD) (not shown), digital versatile disk (DVD) (not shown), and so forth). These components may be connected to the system board 1002, mounted to the system board, or combined with any of the other components.

The communication package 1006 enables wireless and/or wired communications for the transfer of data to and from the computing device 1000. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 1006 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3 G, 4 G, 5 G, and beyond. The computing device 1000 may include a plurality of communication packages 1006. For instance, a first communication package 1006 may be dedicated to shorter range wireless communications such as Wi-Fi and Bluetooth and a second communication package 1006 may be dedicated to longer range wireless communications such as GPS, EDGE, GPRS, CDMA, WiMAX, LTE, Ev-DO, and others.

The cameras 1032 including any depth sensors or proximity sensor are coupled to an optional image processor 1036 to perform conversions, analysis, noise reduction, comparisons, depth or distance analysis, image understanding and other processes as described herein. The processor 1003 is coupled to the image processor to drive the process with interrupts, set parameters, and control operations of image processor and the cameras. Image processing may instead be performed in the processor 1003, the graphics processor 1012, the cameras 1032, or in any other device.

In various implementations, the computing device 1000 may be a laptop, a netbook, a notebook, an Ultrabook, a smartphone, a tablet, a personal digital assistant (PDA), an ultra-mobile PC, a mobile phone, a desktop computer, a server, a set-top box, an entertainment control unit, a digital camera, a portable music player, or a digital video recorder. The computing device may be fixed, portable, or wearable. In further implementations, the computing device 1000 may be any other electronic device that processes data or records data for processing elsewhere.

Embodiments are implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Various components can be a means for performing the operations or functions described.

One embodiment provides for an apparatus comprising a peripheral including a first set of secure fuses having a first credential burned therein and a processor including a second set of secure fuses having a second credential burned thereon. The firmware on the processor is to receive, from the peripheral, a first security attribute derived from the first credential, derive a shared secret based on the first security attribute and a second security attribute derived from the second credential, and transmit the shared secret to the peripheral. The peripheral can include a non-volatile that is used to store the shared secret. The processor can derive the shared secret during a first power cycle. During a second power cycle, the peripheral can prompt the processor to re-derive the shared secret. The processor and the peripheral can each generate a set of ephemeral session keys from the shared secret and one or more nonces. The set of ephemeral session keys can be used to enable symmetric encryption and message authentication of messages between the processor and the peripheral. The set of ephemeral session keys can include one or more message integrity keys and/or one or more encryption keys. In one embodiment the peripheral includes a security engine. In one embodiment the peripheral includes a trusted platform module. In one embodiment the peripheral includes a non-volatile memory controller. In one embodiment the peripheral includes a secure I/O controller, such as a Thunderbolt controller of a PCIe controller.

In one embodiment the peripheral includes a read-only memory (ROM) and a firmware. The ROM is can read the first credential from the first set of secure fuses, derive the first security attribute from the first credential and a security version number of the firmware of the peripheral, and provide the first security attribute to the firmware. The peripheral firmware can provide a certificate to the processor, the certificate including the first security attribute. In one embodiment the certificate is signed by a certificate authority and a public key of the certificate authority is hardcoded in the peripheral. The public key of the certificate authority can be stored in the first set of secure fuses.

In one embodiment the processor includes a read-only memory (ROM). The ROM can read the second credential from the second set of secure fuses, derive the second security attribute from the second credential and a security version number of the firmware of the processor, and provide the second security attribute to the firmware of the processor. The firmware of the processor can store a certificate including a signature of a certificate authority and a public key of the certificate authority is hardcoded in the processor. The public key of the certificate authority can be stored in the second set of secure fuses.

One embodiment provides for a method comprising reading, by instructions loaded from read-only memory of a processor, a seed value from a set of secure fuses on the processor, the seed value accessible only to the instructions loaded from the read-only memory, determining a security version number of firmware on the processor, where the firmware of the processor is updatable, generating one or more credentials based on the seed value and the security version number of the firmware, and providing the one or more credentials to the firmware on the processor, the firmware to derive a shared secret based on the one or more credentials. The method additionally comprises determining a first security version number of the firmware of the processor during a first boot, generating a first version of the one or more credentials based on the first security version number, determining a second security version number of the firmware of the processor during a second boot, the firmware of the processor having been updated between the first boot and the second boot, and generating a second version of the one or more credentials based on the second security version number.

One embodiment provides for a non-transitory machine-readable medium storing instructions for execution by a processor, the instructions loaded from a read-only memory of the processor. The instructions cause the processor to perform operations comprising the method described above.

One embodiment provides for a method of registering a peripheral with a processor to enable establishment of a secured communication channel between the peripheral and the processor. The method comprises transmitting a registration message from the peripheral to the processor over a system interconnect bus, the registration message including a peripheral certificate; receiving a shared secret from the processor in response to the registration message, the shared secret derived from a public key within the peripheral certificate; storing the shared secret in non-volatile memory of the peripheral; generating a set of ephemeral session keys from the shared secret; and establishing the secured communication channel with the processor over the system interconnect bus via the set of ephemeral session keys. The value of the shared secret is based on a security version number of a firmware within the peripheral. The value of the shared secret can also be based on the security version number of the firmware within the processor. The public key within the peripheral certificate is derived based on a security version number of firmware within the peripheral. Additionally, the set of ephemeral session keys can include one or more of an encryption key and a message integrity key.

One embodiment provides for a non-transitory machine-readable medium storing instructions for execution by a peripheral to cause the peripheral to perform operations comprising the method described above.

In a further embodiment, the method additionally comprises reading, via instructions from a read-only memory in the peripheral, a seed stored in secure fuses of the peripheral; deriving a private key based on the seed and a security version number of firmware within the peripheral; deriving the public key based on the private key; and adding the public key to the peripheral certificate. The method can additionally comprise receiving a processor credential at the peripheral, the processor credential derived by the processor based on the security version number of the firmware within the processor; iteratively applying a one-way function to the processor credential to arrive at a touchstone value; and comparing the touchstone value to a known touchstone value to authenticate the processor.

One embodiment provides a method of registering a processor with a peripheral to enable establishment of a secured communication channel between the processor and the peripheral. The method comprises receiving, at a processor firmware, a processor credential from a boot ROM of the processor, the processor credential generated based on a security version number of the firmware; receiving a registration message from the peripheral via a system interconnect bus, the registration message including a peripheral certificate; verifying a signature on the peripheral certificate using a public key hardcoded within the processor; generating a shared secret based on a peripheral public key within the peripheral certificate; transmitting the shared secret and the processor credential to the peripheral, the processor credential to enable authentication of the processor by the peripheral; generating a set of ephemeral session keys from the shared secret; and establishing the secured communication channel with the peripheral over the system interconnect bus via the set of ephemeral session keys. The value of the peripheral public key can be based on a security version number of firmware within the peripheral. The value of the shared secret is based on the security version number of the processor firmware. The value of the shared secret can be additionally based on the security version number of the firmware within the peripheral. Additionally, the set of ephemeral session keys can include one or more of an encryption key and a message integrity key.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
    a peripheral including a first set of secure fuses having a first credential burned therein; and
    a processor including a second set of secure fuses having a second credential burned thereon, wherein firmware on the processor is to receive, from the peripheral, a first security attribute derived from the first credential, derive a shared secret based on the first security attribute and a second security attribute derived from the second credential, and transmit the shared secret to the peripheral, wherein the processor is to derive the shared secret during a first power cycle, and wherein during a second power cycle, the peripheral is to prompt the processor to re-derive the shared secret.

2. The apparatus as in claim 1, wherein the peripheral includes a non-volatile memory, the peripheral is to store the shared secret to the non-volatile memory.

3. The apparatus as in claim 1, wherein the processor and the peripheral are to each generate a set of ephemeral session keys from the shared secret and one or more nonces.

4. The apparatus as in claim 3, wherein the processor and the peripheral are to securely exchange messages using the set of ephemeral session keys.

5. The apparatus as in claim 4, wherein the set of ephemeral session keys includes one or more message integrity keys.

6. The apparatus as in claim 4, wherein the set of ephemeral session keys includes one or more encryption keys.

7. The apparatus as in claim 4, wherein the peripheral includes one or more of a security engine, a trusted platform module, a non-volatile memory controller, or a secure I/O controller.

8. The apparatus as in claim 7, wherein the secure I/O controller includes a Thunderbolt controller or a peripheral component interconnect express controller.

9. The apparatus as in claim 1, wherein the peripheral includes a read-only memory (ROM) and peripheral firmware, and wherein:
    the ROM is to read the first credential from the first set of secure fuses, derive the first security attribute from the first credential and a security version number of the firmware of the peripheral, and provide the first security attribute to the peripheral firmware; and
    the peripheral firmware is to provide a certificate to the processor, the certificate including the first security attribute, wherein the certificate is signed by a certificate authority.

10. The apparatus as in claim 1, wherein the processor includes a read-only memory (ROM) and the ROM is to read the second credential from the second set of secure fuses, derive the second security attribute from the second credential and a security version number of the firmware of the processor, and provide the second security attribute to the firmware of the processor.

11. A non-transitory machine-readable medium storing firmware instructions for a peripheral, the instructions to cause the peripheral to perform operations comprising:

transmitting a registration message from the peripheral to a processor over a system interconnect bus, the registration message including a peripheral certificate;

receiving a shared secret from the processor in response to the registration message, the shared secret derived from a public key within the peripheral certificate, wherein a value of the shared secret is based on a security version number of a firmware within the peripheral and the security version number of the firmware within the processor;

storing the shared secret in non-volatile memory of the peripheral;

generating a set of ephemeral session keys from the shared secret; and establishing the secured communication channel with the processor over the system interconnect bus via the set of ephemeral session keys.

12. The non-transitory machine-readable medium as in claim 11, wherein the public key within the peripheral certificate is derived based on a security version number of firmware within the peripheral.

13. The non-transitory machine-readable medium as in claim 11, wherein the set of ephemeral session keys includes one or more of an encryption key and a message integrity key.

14. The non-transitory machine-readable medium as in claim 11, additionally comprising:

reading, via instructions from a read-only memory in the peripheral, a seed stored in secure fuses of the peripheral;

deriving a private key based on the seed and a security version number of firmware within the peripheral;

deriving the public key based on the private key; and adding the public key to the peripheral certificate.

15. The non-transitory machine-readable medium as in claim 14, the operations additionally comprising:

receiving a processor credential at the peripheral, the processor credential derived by the processor based on the security version number of the firmware within the processor;

iteratively applying a one-way function to the processor credential to arrive at a touchstone value; and comparing the touchstone value to a known touchstone value to authenticate the processor.

16. A method of registering a processor with a peripheral to enable establishment of a secured communication channel between the processor and the peripheral, the method comprising:

receiving, at a processor firmware, a processor credential from a read-only memory of the processor, the processor credential generated based on a security version number of the firmware;

receiving a registration message from the peripheral via a system interconnect bus, the registration message including a peripheral certificate;

verifying a signature on the peripheral certificate using a public key hardcoded within the processor;

generating a shared secret based on a peripheral public key within the peripheral certificate;

transmitting the shared secret and the processor credential to the peripheral, the processor credential to enable authentication of the processor by the peripheral;

generating a set of ephemeral session keys from the shared secret; and establishing the secured communication channel with the peripheral over the system interconnect bus via the set of ephemeral session keys.

17. The method as in claim 16, wherein a value of the shared secret is based on the security version number of the processor firmware and the security version number of the firmware within the peripheral.

* * * * *